VIDEO TAPE MONITOR WITH LONGITUDINAL SCANNING
OF TRANSVERSE VIDEO TRACK

Filed March 26, 1965 2 Sheets-Sheet 1

INVENTOR
ROY F. LA VIOLETTE,
By Edmond F. Shanahan
ATTORNEY.

INVENTOR.
ROY F. LAVIOLETTE,
By Edmond F. Shanahan
ATTORNEY.

3,404,223

VIDEO TAPE MONITOR WITH LONGITUDINAL SCANNING OF TRANSVERSE VIDEO TRACK

Roy F. La Violette, 3256 Stoner Ave., Los Angeles, Calif. 90066

Filed Mar. 26, 1965, Ser. No. 442,945
3 Claims. (Cl. 178—6.6)

ABSTRACT OF THE DISCLOSURE

A video tape monitor in which a monitor head is supported on a retractable monitor head carried adjacent the path of the video tape, at a location which is immediately downstream from the video recording head during recording; and automatic retracter means responsive to the travel of the video tape, for retracting the monitor head from an active position adjacent to tape, when the tape is not in recording movement; and including amplifier and oscilloscope presentation means for displaying in wave form and output from said monitor head to reveal the quality of the record being made on said video tape.

This invention relates generally to an auxiliary device to be used in conjunction with machines for recording and playing back television programs recorded on magnetic video tape. More particularly, the invention is a monitor for the quality of video recording and for the functioning of the video recording machine. The invention employs a set of magnetic scanning heads which longitudinally scan the transverse video bands, as well as the longitudinally recorded information by means adapted to be received on standard commercial video recording playback machines, immediately after the tape leaves the recording-playback heads and before it is wound on the take-up reel.

Many television broadcasts are made from a magnetic record on video tape, rather than from live action, or motion picture film. The video tape recording is essentially a complex tape recorder and tape player with several different types of magnetic recording heads for magnetically recording several parallel tracks along the magnetic tape. Most of the width of the tape is occupied by the video track, which records the equivalent of a moving picture, by means of a series of bands which are very nearly transverse to the tape and its direction of travel. The sound is recorded in an audio track only .075 of an inch wide along one edge of the tape; on the opposite edge of the tape, there are two tracks of minute width: a control track .050 of an inch wide and a cue track .020 of an inch wide. The transverse bands of video track are produced by four magnetic heads mounted on a rotating drum, the drum being mounted with its rotation axis parallel to the line of tape travel: the drum is rotated at a very high speed to produce the series of substantially, but not exactly, transverse bands of video recording, in a repeating sequence of four-band sets. The magnetic record on the video tape cannot ordinarily be visually inspected. Its presence can be detected by a sprinkling of iron powder or editing liquid to reveal the existence and general area of the magnetized portions. However, this process is not of value for continuously monitoring the tape, not only because it is clumsy to use, but also because it provides little or no information other than the mere presence of the magnetic record.

Unfortunately, undetected machine breakdowns, tape defects, or operational errors occur with costly frequency in television studios and wherever video recording equipment is used. Sometimes, the failure to make a recording suitable for broadcasting results in an irreparable loss; a news event goes unrecorded, or an unrepeatable performance occurs without record.

Usually, a failure to obtain a satisfactory recording is not discovered until the video tape is played back hours or days later. Meanwhile, a continuance in use of a defective machine, or the repetition of an operational error may result in the loss of many hours of recording.

Such losses could be reduced to negligibility in most cases, if the failure to produce a satisfactory video tape record were immediately detected at the time it first occurred, and in the instant following the instant of recording, i.e., by the operator of the video recorder. In most instances, the operator has available an alternative machine, or means of correcting the error or defect, provided he knows that trouble exists. At the present time, such monitoring is not carried out because no suitable means for monitoring is available. Of course, it would be possible to continuously monitor by continuous immediate playback of the tape on a complete video tape player and television set projection means. Such a monitor method would not only be expensive and bulky but it would be inferior to the method of the present invention because it would fail to provide some of the specific information provided by the method and apparatus of the present invention, which make possible correction of the most common errors and defects. It is not enough that playback reveal that something is wrong if it fails to provide specific revelation of what is wrong. Furthermore, a complete video tape player is not a satisfactory monitor, since its complexity is so great that the chances of failure of the monitor are as great as those of the original recorder.

The present invention provides a simple and novel method and apparatus for continuously monitoring the video track by means which can be incorporated almost entirely within any standard player. Moreover, the method and apparatus of the present invention instantly informs the operator, at first occurrence, of certain of the major sources of recording failure. More importantly, the method and apparatus of the present invention will warn of gradual deterioration of the video recording heads, or of tape, long before they begin to spoil tapes or would otherwise be detected. Thus, preventive maintainance in advance of actual malfunctioning can be relied upon to a much greater degree than at present.

It is desirable that the monitor of the invention be employed on the video tape machine when it is being used to play back a previously made recording, as well as when it is engaged in the recording process. While it is true that playback provides some of the information not available when the recording is made—such as the fact that a video tape is in fact passing through the machine—nevertheless, the monitor gives warning of some defects which do not appear in the playback picture on the television tube. Also, some defects which do make their appearance on the television tube leave the operator guessing as to precisely what deficiencies are causing the trouble; while the monitor of this invention does not purport to cover all possible defects, it does provide a simple means of acquiring additional information which will specify certain common ones. For example, horizontal striping in an ordinary 16 inch television tube picture, may indicate that one video recording head, or playback head, is defective, and it may be possible for a skilled operator viewing the tube to quickly ascertain which of the video heads is defective. However, the monitor display will not only reveal the defect at a much earlier stage of deterioration than would appear by the horizontal striping in the picture, but it will also provide such additional information as to whether the head is worn down to roundness, or simply recording a low level track for some reason or another. Also, the monitor of the invention will show whether the poor presentation is resulting from a loss on the tape itself or from malfunctioning of the playback machine.

The many advantages of the method and apparatus of the present invention will best be understood from the following description of one preferred embodiment and its application, which are illustrated in the accompanying drawings, in which.

Figures 1, 2, 3:
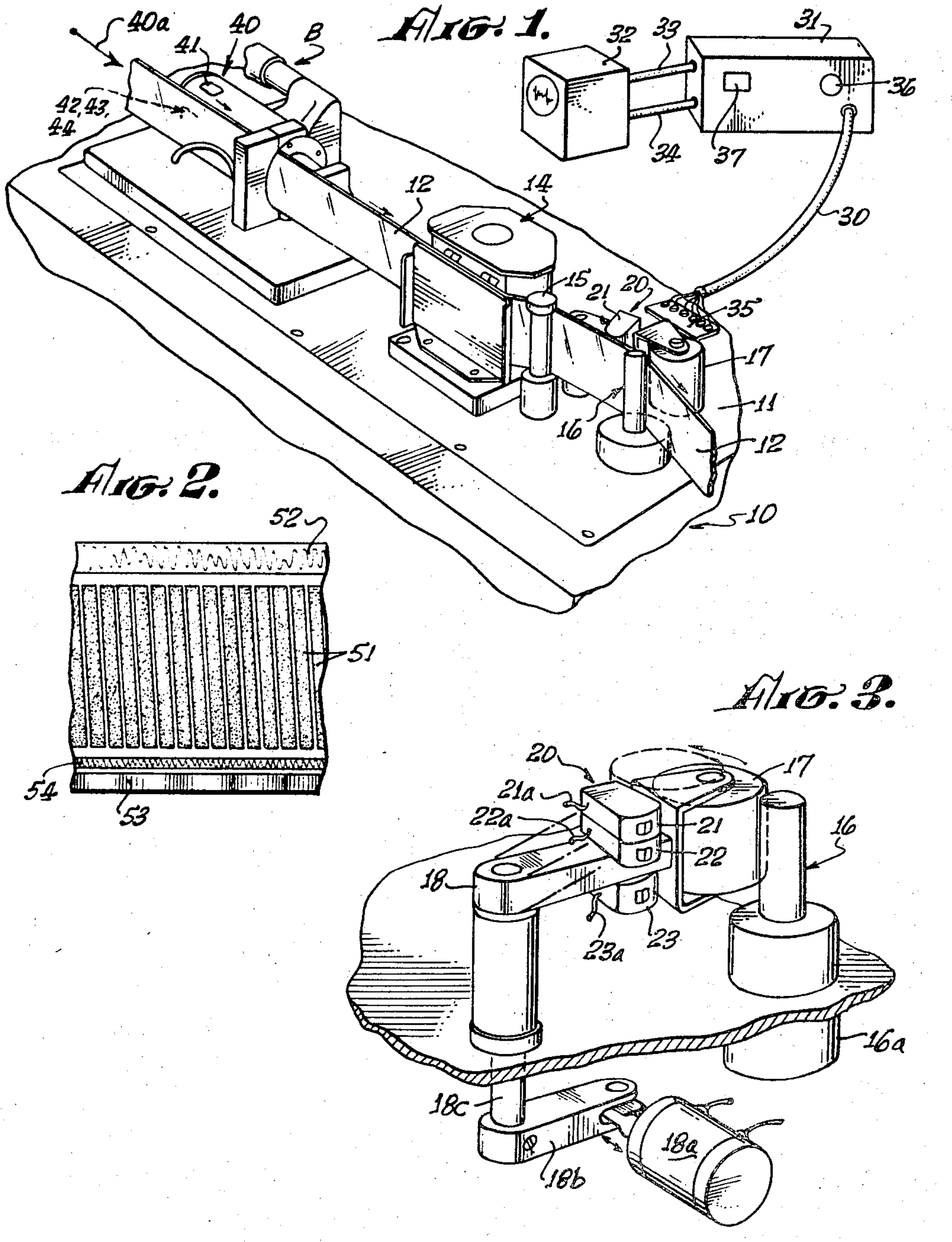
FIGURE 1 is a diagrammatic perspective view of a fragment of a video tape recording machine's tape deck, and the associated parts of a monitor constructed according to the present invention.
FIGURE 2 is representational view of a piece of video tape with various tracks of magnetic recording shown visually, and distorted in size for purposes of illustration.
FIGURE 3 is a perspective view of the monitor detection heads and the retractable head carrier employed in the invention.

In FIGURE 1, a video tape recording machine 10 is indicated fragmentarily. The only directly relevant portion of the tape recording machine 10 is a part of the tape deck 11, but the feed reel, take-up reel, and various pulleys, standard on such shaped tape decks are not illustrated, since they would merely clutter these drawings with items which are standard to all video tape machines and play no part in the novelty of this invention, so far as their structure is concerned.

In any event, standard video tape 12 is shown in the process of being transported over the tape deck 11 through a video recording head indicated generally by the numeral 13, past a stationary recording head mount 14, for recording audio track, control track, cue track, etc.; past an idler 15, a capstan drive 16, and a retractable pinch roller 17.

The video tape 12, as seen in FIGURE 2, is typically constructed of a strong plastic, such as Dupont Mylar, a few thousandths of an inch thick, and two inches wide. For purposes of illustration, the various tracks are distorted in size. It will be seen that the main and central portion of the track is entirely occupied by a series of obliquely disposed transverse bands 21, which represent the magnetic record produced by the rotating video head.

The pinch roller 17 is carried on a swinging retractable arm 18, seen in detail in FIGURE 3. In the preferred form of the invention illustrated, the swinging arm 18 is provided with one or more monitor heads, indicated in FIGURE 1 collectively by the numeral 20, and three heads identified as 21, 22, and 23 being revealed in the drawing of FIGURE 3.

As will be explained hereinafter, monitor signals detected by the monitor heads 20 are transmitted through a multiple wire cable 30 to a monitor circuit system 31, which delivers an amplified video track monitor signal to a display oscilloscope 32 by way of line 33; an oscillator contained within the monitor circuit system 31 generates a suitable frequency for oscilloscope 32 and delivers it to the oscilloscope by way of line 34.

Tape 12 is typical video tape, constructed of a strong plastic ribbon, such as Dupont Mylar, a few thousandths of an inch thick and two inches wide, and coated with a fine coating of iron oxide particles so as to accept magnetic recording. The video recording head 13 is provided with a drum 40, rotatably mounted with its axis of rotation parallel to the direction of tape travel indicated by the arrow 41, the drum 40 being driven during recording (and playback) at a speed of about 240 revolutions per second. The drum 40 may be referred to as a "head drum" since it carries on its surface four magnetic heads, which may be designated as heads 41, 42, 43, and 44, although only head 41 is visible in FIGURE 2, which are spaced radially around the drum 90° apart so that only one head is sweeping over the surface of the video tape 12 at a time.

Since the tape 12 is moving in the direction of arrow 41 at a speed of about 15 inches per second, whereas the rotating heads 41 to 44 are moving transversely across the surface of the video tape at a speed of about 1500 inches per second, a recording is produced which has the appearance of a series of obliquely transverse bands 51 as indicated in FIGURE 2. It will be understood that the obliquity is caused because the tape does move forward a short distance during the time it takes a single video head to sweep from one side of the video track area to the other. It will be obvious that the obliquity of the video track bands prevents them from being correctly referred to as exactly transverse to the tape 12; however, the term "obliquely transverse" will be used to indicate the bands' disposition as nearly transverse, but departing a few degrees from perfectly transverse position by virtue of the simultaneous tape transport and video head movement.

It will be appreciated that the dimensions shown in FIGURE 2 have no relationship whatever to the actual dimensions of the recording track. The actual video track bands are about 10 mils wide with approximately 5 mils separation between successive bands. Four adjacent tracks are each made from a different one of the four heads, and then the sequence of four is repeated again and again along the video recording track 51. The audio track 52 is much exaggerated in width, since it is actually only about 75 mils wide in a typical television tape recording system. The control track 53 is typically about 50 mils wide, and a cue track 54, not present on all video tapes, is typically 20 mils wide. The width of the video track 51 (i.e., the length of the bands which comprise it) is only a few tenths of an inch less than two inches.

The audio track 52, a control track 53, and the cue track 54 are recorded entirely longitudinally by conventional stationary heads mounted in stationary head column 14, and will not be described in detail, since they are standard in the video tape recording and other tape recording machines.

When a video tape machine is being driven at its recording and playback speed of 15 inches per second, the tape is pulled at that speed past the recording heads of 13 and 14 by capstan 16, driven by capstan motor **16*a*. The same circuits which place the capstan motor 16*a* in driving rotation actuate a solenoid 18*a* which pulls the pinch roller arm 18 (through lever 18*b* and shaft 18*c*) to bring the pinch roller 17 into engagement with tape 12, pressing tape 12 into driving pressure against capstan 16. This occurs whether a recording is being made, or a recorded tape is being played back. At all other times, the solenoid 18*a* is released, and the pinch roller 17 is retracted from the tape 12**, so that it may be freely driven at high speed, either forward or backward, by driving take-up or feed reels, respectively.

Since it is desired to monitor the recording on the video tape immediately after recording or immediately after playback, the monitor heads 21, 22, and 23 are fastened on the retractable arm 18, and are thus moved into detecting position with their pick-up heads at the surface of tape 12 during recording and playback, or are retracted during fast forward or reverse wind.

In the particular embodiment illustrated, only three monitor heads 21, 22, and 23 are shown, for audio, video, and control track, respectively, but it will be understood that a fourth head could be added for the cue track, if desired.

All three heads are connected by flexible wires indicated at 21*a*, 22*a*, and 23*a* to a terminal block 35, which provides the input to cable 30.

The audio signal picked up by audio monitor pick-up head 21 is amplified by a standard audio amplifier and played back through a loudspeaker 36. The operator thus monitors the audio track simply by listening, but he hears it at the very same time that he is also monitoring the video track, a monitor combination which he has never had before except by means of a complete playback video machine. A control track signal picked up by control track monitor head 23 is simply passed to a vu-meter 37, where it may be satisfactorily monitored simultaneously with the audio and the video by simply observing that a proper meter reading is being given.

The signal detected by the video monitor pick-up head 22 must be amplified in order to be suitable for display in oscilloscope 32. It must be understood, however, that the video monitor signal is nothing like true video playback, and amplifiers heretofore used for the amplification of video signals are not suited for the purposes of amplifying the video monitoring signal detected by the device of this invention. In order to make the visual monitor display in the oscilloscope 32 of greatest use, it will be found necessary to provide an amplifier which selectively amplifies lower frequencies more than high frequencies. Amplification may be sufficient either to equalize the signal, that is, to compensate for the greater attenuation of the lower frequencies in the process of detection, or it may be desired to exaggerate the amplification of lower frequencies in order to produce a better monitor system.

The output voltage of the monitor playback head is dependent upon the rate of change of magnetic flux on the tape, that is, the voltage will increase as the frequency increases. Equalization circuits are provided to compensate for this rising characteristic of the playback head, with respect to frequency.

Figures 4, 5:
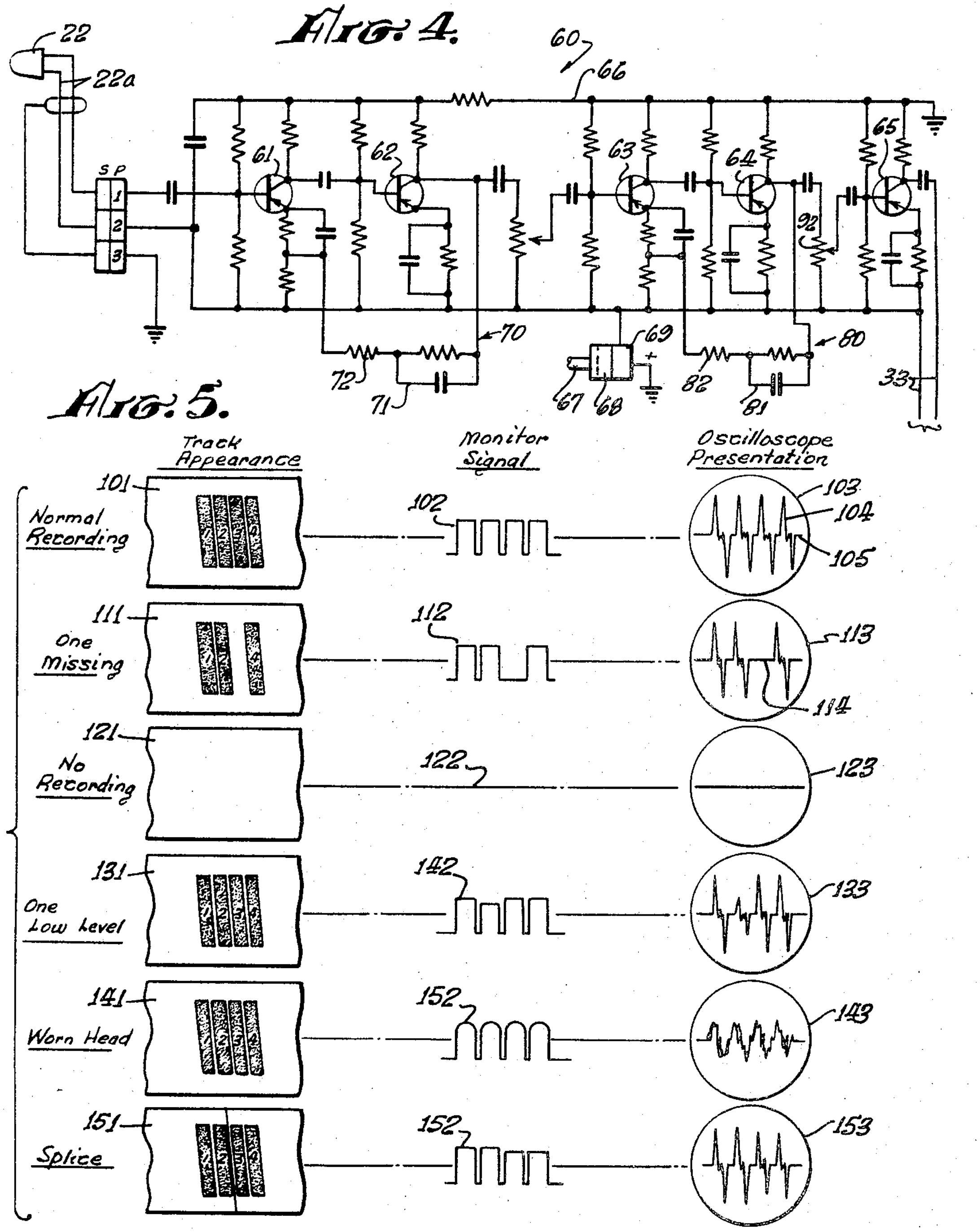
FIGURE 4 is a wiring diagram for a typical amplifier suitable for use in the invention; and, FIGURE 5 is a diagrammatic representation of six different video tape recording conditions which can be recognized and identified by the method and apparatus of the present invention.

One preferred embodiment of a suitable amplifier for the video amplifier signal is a transistor amplifier illustrated by the wiring diagram of FIGURE 4. The amplifier, indicated generally by the numeral 60, receives its input from the video monitor head 22 via the leads 22*a* (which pass through the multistrand cable 30) and produces an output which is transmitted to the oscilloscope 32 to the lines 33.

The amplifier 60 employs five transistors 61, 62, 63, 64, and 65, in a circuit system indicated generally by the numeral 66, and provides five stages of amplification. The amplifier 60 is supplied with DC power at 20 volts by means of 110 volt AC supplied at 67 and converted by transformer 68 and rectifier circuit 69.

Especially to be noted are the two feedback circuits 70 and 80, the former providing some of the output signal for transistor 62 as negative feedback to the emitter of the transistor 61; and the latter providing similar feedback between the output of transistor 64 and the emitter of transistor 63. The feedback loops 70 and 80 include band pass filters 71 and 81, respectively, which insure greater gain for the lower frequencies in order to provide the desired equalization or enhancement. Feedback loops 70 and 80 are also provided with variable resistors 72 and 82 which may be adjusted to vary the gain, as desired.

An additional gain setting variable resistor 92 is provided between transistors 64 and 65.

It will be appreciated that amplification and equalization could have been achieved with vacuum tubes as well as transistors, and that various other alternative amplifier designs might be employed, provided, preferably, that they have a plurality of gain adjustments for selectively amplifying different frequency ranges at different rates of gain.

It will also be appreciated that the oscilloscope is provided with standard internal amplification systems to provide any additional amplification required for a suitable vertical presentation. Also, a sweep circuit system of any standard type, suitable for the particular video tape recording machine, may be incorporated in the monitor control circuit system 31 to provide the sweep signal through line 34. For example, the standard Ampex and RCA broadcast type of video tape recorders, having four heads, would require a 240 cycle per second sweep.

FIGURE 5 illustrates six different monitor presentations for the video track, corresponding to six different video track conditions. The track appearance in the first situation, for a normal recording on tape, as indicated at 101, produces a perfectly square signal under ideal conditions, as indicated at 102. Assuming that an amplifier as specified in the preferred form of the invention is employed to remedy any loss of low frequencies experienced in the monitor detection head 22, an ideal oscilloscope presentation 103 will appear. It will be noted that the oscilloscope 32 has been adjusted to provide just four band signal cycles corresponding to the four video recorder heads 41, 42, 43, and 44. With the use of a proper amplifier, adjusted to achieve suitable equalization, a perfect recording track will be represented by a perfectly sharp series of "spikes" 104 above and below a well-defined reference line 105.

The second situation is illustrated in the tape recording 111, in which one band is missing because one head is entirely inoperative. The magnetic signal produced by such track is illustrated at 112, and the display on oscilloscope 32 appears at 113, in which it is revealed that head number 3 is conspicuously missing by the loss of one trace cycle at 114.

It has been found that in most instances it is not necessary to have a plurality of gain adjustments for selectively amplifying different frequencies. I have found that an amplifier with a six db per octave slope, from 20 cycles to 10,000 cycles, with the highest gain at the lowest frequencies, works quite well.

Video tape recorders are vulnerable to slow wear of the rotating recording heads 41, 42, 43, and 44. This wear usually occurs in one of two ways: the gap width increases, thereby reducing the frequency response at the higher frequencies on playback; or one of the heads wears at the edges, reducing the energy in the recorded track, resulting in lower signal to noise ratio in the reproduced picture. Unfortunately, it is in the nature of presently used video tape recorders to conceal these and other defects as they first begin to occur and at a stage when they could be corrected, if easily detected, before the loss of any valuable broadcasting tape. The present standard types of four-head recorders employ a carrier of five megacycles, frequency modulated by the video information. The reproduced FM signal is amplified and limited many times before demodulating back to a video signal. This limiting reduces the effect of "drop-outs" and loss of signal due to imperfections in making the magnetic video recording, regardless of whether these may have arisen from malfunctioning of the tape recorder, defects in the tape, or whatever. A small change in the strength of the carrier signal due to the design or condition of a given head in the head assembly 40 is not noticeable in the video broadcast or playback signal. Also, discrepancies between the bands laid down by different heads, or the acceptance of magnetic recording on different strips of tapes which have been spliced together are not readily detectable. At the present time, the operator, or maintenance engineer, must resort to difficult and inadequate modes of inspection, which consume substantial amounts of costly professional time, in order to discover the specific details which are quickly and easily revealed at an early stage of development, by the monitor of the present invention. For example, the tape can be inspected by covering it with editing solution (a suspension of fine magnetic particles in naphtha or the like) and, after drying, making microscopic measurements of track width. The heads 41, 42, 43, and 44 can be inspected for wear by means of a microscope, but this is not a practical type of test, particularly since the degree of wear may be in the order of microinches.

In the monitor of the present invention, however, if a given head records a slightly lower or higher signal on the magnetic tape, as indicated at 131, the magnetic signal reproduced being shown at 132, the difference in level can clearly be seen on the oscilloscope 32 as indicated at 133. Also, a degree of wear which reduces the width of one particular band will produce a horizontal reduction in monitor display signal. In either of these cases, by using a fully expanded sweep on the oscilloscope 32, and by calibrating against known measured heads, the monitor can be employed to provide a quick and easy, and fairly close measurement of both gap and band width.

A substantially worn video head system 40 may lay down a series of bands, as illustrated at 141, which would appear satisfactory if visually inspected. However, the worn heads would produce a rounded signal as indicated at 142, and this would appear in the deterioration of the four cycles presented as at 143.

If two different pieces of tape are spliced together as shown in the splice 151, and the two tapes do not accept magnetic recording equally well, a signal at the splice point will change as shown at 152, and the operator will note from the display at 153 that his vertical dimension has suddenly been reduced.

It will be seen from the foregoing that the method and apparatus of my monitoring system provide a wealth of information not hitherto available, and they provide it by means which can be added to present commercial video tape recorders at low cost, and without impairing their efficiency of operation in the slightest.

In its simplest form, only the video track would be monitored, since that track is by far the most valuable. However, the same installation of a retractable video monitor head 22 on the pinch roller arm 18 is easily combined with similarly mounted monitor heads 21 and 23 for the other tracks. Although I have not illustrated a full monitor head for the cue track, it will be obvious that such a monitoring head can also be added.

The combination of the video monitor system with monitors for the audio and control tracks have advantages in combination which neither audio monitor nor control track monitor, nor visual presentation of the video track would provide. For example, at the present time, if it is discovered that the control track is either missing or so defective that it cannot be relied upon, then the entire tape is considered to be spoiled. However, with applicant's complete monitor system, it is possible to detect what parts of the control track are unsatisfactory, and it is further possible to reconstruct portions or an entire new control track from the video monitor signal. The video monitor signal produces a 960 cycle signal, corresponding to the video bands, which can be divided by circuit means to a satisfactory recreated 240 cycle control signal, which may then be precisely recorded in the control track position, in parallel with the existing video signal, thus salvaging an otherwise lost video tape.

While I have described one preferred form of a monitor constructed according to my invention, and the method of operating it, it will be recognized that many variations, modifications, and elaborations of both apparatus and method might be employed without departing from the scope of the invention, which is not to be limited to the details disclosed herein, but is to be accorded the full scope of the claims so as to embrace any and all equivalent devices and methods.

Having thus described my invention, what I claim as new and desire to secure by Letters Patent is:

1. A monitoring device for continuously indicating the existence and specific qualities of a video tape record of the type which is comprised of obliquely transverse bands recorded on a tape in a repeating series related to a corresponding number of rotating video recording heads, which device includes:

a retractable head carrier disposed adjacent the path of said video tape between its recording in said video tape recorder and its point of reel storage therein, which carrier is movable between a detection position adjacent said tape and an inactive position retracted from said tape;

a video monitor head carried on said head carrier and adapted to make a stationary detection of said video record bands as said tape is transported past said carrier when said carrier is in the detecting position;

retractor means automatically responsive to the travel of said tape, for moving said carrier into detecting position when said tape is traveling at recording speed in the recording direction, and to retract said carrier to said inactive position when said tape is not so moving;

amplifier means to amplify the signal detected by said video monitor head for oscilloscope presentation, said amplifier having selectively greater gain for lower frequencies to present a clear monitor signal;

and oscilloscope presentation means for visual display of the output of said amplifier.

2. A monitoring device for continuously indicating the existence and specific qualities of a video tape record of the type which is comprised of obliquely transverse bands of information recorded on a tape in a repeating series related to a corresponding number of rotating video recording heads, which device includes:

a retractable head carrier disposed adjacent the path of said video tape between its recording in said video tape recorder and its point of reel storage therein, which carrier is movable between a detection position adjacent said tape and an inactive position retracted from said tape;

a plurality of heads carried on said head carrier and adapted to make separate stationary detection of each track on said video tape as said tape is transported past said carrier when said carrier is in the detecting position;

retractor means automatically responsive to the travel of said tape, for moving said carrier into detecting position when said tape is traveling at recording speed in the recording direction, and to retract said carrier to the inactive position when said tape is not so moving;

amplifier means to amplify the signal detected from said video bands for oscilloscope presentation, said amplifier having adjustable gain means for selectively amplifying different frequencies;

oscilloscope presentation means for visual display of the output of said amplifier with the sweep frequency of said oscilloscope adjusted to display bands from all four video recording heads simultaneously;

and monitor means for presentation of the non-video tracks on said video tape.

3. A monitoring device for continuously indicating the existence and specific qualities of a video tape record of the type which is comprised of obliquely transverse bands recorded on a tape in a repeating series related to a corresponding number of rotating video recording heads, which device includes:

a retractable head carrier disposed adjacent the path of said video tape between its recording in said video tape recorder and its point of reel storage therein, which carrier is movable between a detection position adjacent said tape and an inactive position retracted from said tape;

a video monitor head carried on said head carrier and adapted to make a stationary detection of said video record bands as said tape is transported past said carrier when said carrier is in the detecting position;

retractor means automatically responsive to the travel of said tape, for moving said carrier into detecting position when said tape is traveling at recording speed in the recording direction, and to retract said carrier to said inactive position when said tape is not so moving; and amplifier and oscilloscope presentation for visual display of the output of said amplifier.

References Cited

UNITED STATES PATENTS 3,225,135 12/1965 Osawa -------------- 178—6.6

ROBERT L. GRIFFIN, *Primary Examiner.*

H. W. BRITTON, *Assistant Examiner.*